United States Patent
Simpson et al.

(10) Patent No.: US 8,858,846 B2
(45) Date of Patent: Oct. 14, 2014

(54) TITANIUM CARBIDE AS A FRICTION AND WEAR MODIFIER IN FRICTION MATERIALS

(75) Inventors: Allen H. Simpson, Buchanan, MI (US);
Slawomir T. Fryska, Granger, IN (US);
Mark L. La Forest, Granger, IN (US);
Nabil Abu Gharbieh, Granger, IN (US)

(73) Assignee: Honeywell International Inc., Morristown, NJ (US)

(*) Notice: Subject to any disclaimer, the term of this patent is extended or adjusted under 35 U.S.C. 154(b) by 1189 days.

(21) Appl. No.: 12/410,903

(22) Filed: Mar. 25, 2009

(65) Prior Publication Data

US 2011/0180946 A1    Jul. 28, 2011

Related U.S. Application Data

(62) Division of application No. 10/980,033, filed on Nov. 3, 2004, now abandoned.

(60) Provisional application No. 60/558,111, filed on Apr. 1, 2004.

(51) Int. Cl.
| | | |
|---|---|---|
| C01B 31/00 | (2006.01) | |
| C04B 35/80 | (2006.01) | |
| B82Y 30/00 | (2011.01) | |
| C04B 35/56 | (2006.01) | |
| F16D 69/02 | (2006.01) | |

(52) U.S. Cl.
CPC ....... *F16D 69/023* (2013.01); C04B 2235/5454 (2013.01); C04B 2235/96 (2013.01); *C04B 35/806* (2013.01); *B82Y 30/00* (2013.01); *C04B 35/5611* (2013.01); C04B 2235/5445 (2013.01); C04B 2235/48 (2013.01); C04B 2235/5248 (2013.01)
USPC ...................................... 264/29.1

(58) Field of Classification Search
USPC ...................................... 264/29.1
See application file for complete search history.

(56) References Cited

U.S. PATENT DOCUMENTS

| | | | |
|---|---|---|---|
| 3,759,353 A | 9/1973 | Marin | |
| 3,867,491 A | 2/1975 | Marin | |
| 3,932,568 A | 1/1976 | Watts et al. | |
| 4,007,814 A | 2/1977 | Berger | |
| 4,339,021 A | 7/1982 | Kosuda et al. | |
| 4,815,572 A | 3/1989 | Froberg et al. | |
| 5,007,508 A | 4/1991 | Lacombe | |
| 5,169,718 A * | 12/1992 | Miura et al. | 428/408 |
| 5,380,475 A | 1/1995 | Goedtke et al. | |
| 5,383,963 A | 1/1995 | Kobayashi et al. | |
| 5,878,849 A | 3/1999 | Prunier, Jr. et al. | |
| 5,957,251 A | 9/1999 | Jones et al. | |
| 5,964,320 A | 10/1999 | Kato et al. | |
| 6,110,268 A | 8/2000 | Gross et al. | |
| 6,110,535 A | 8/2000 | Rey et al. | |
| 6,261,692 B1 * | 7/2001 | Park et al. | 428/408 |
| 6,355,206 B1 | 3/2002 | Hanzawa et al. | |
| 6,390,304 B1 | 5/2002 | Wilson et al. | |
| 6,458,466 B1 | 10/2002 | Jones et al. | |
| 2003/0057040 A1 | 3/2003 | Bauer et al. | |
| 2003/0180527 A1 | 9/2003 | Bauer et al. | |
| 2003/0207749 A1 | 11/2003 | Bauer et al. | |
| 2004/0127600 A1 | 7/2004 | Bauer et al. | |

FOREIGN PATENT DOCUMENTS

EP    0 404 571 A1    12/1990

* cited by examiner

*Primary Examiner* — Larry Thrower
(74) *Attorney, Agent, or Firm* — Shumaker & Sieffert, P.A.

(57) ABSTRACT

Methods of making a carbon-carbon composite preforms, particularly suitable as brake discs in aircraft landing systems, by combining titanium carbide particles ranging in size from 0.01 to 10 microns in diameter, resinous binder, and carbon fibers or carbon fiber precursors in a mold, and subsequently subjecting the combined components to pressure and heat to carbonize the resinous binder by methods, thereby providing the carbon-carbon composite preform having particulate titanium carbide uniformly distributed throughout its mass. Prior to combining the titanium carbide and the binder with the fibers in this process, the particulate titanium carbide may be mixed with liquid binder, the resulting TiC/binder mixture may then solidified, and the resulting solid TiC/binder mixture may be ground into a fine powder for use in the process. Also, compositions for preparing a carbon-carbon composite friction materials, and methods of improving wear and dynamic stability in a carbon-carbon composite brake discs.

20 Claims, No Drawings

TITANIUM CARBIDE AS A FRICTION AND WEAR MODIFIER IN FRICTION MATERIALS

This application is a divisional of application Ser. No. 10/980,033, filed Nov. 3, 2004 now abandoned. This application claims priority under 35 U.S.C. §120 to application Ser. No. 10/980,033. This application claims priority under 35 U.S.C. §119(e) to U.S. Provisional Application No. 60/558,111 for "TITANIUM CARBIDE-ENHANCED CARBON-CARBON BRAKE COMPOSITES," filed on Apr. 1, 2004. The entire contents of both of these applications are hereby expressly incorporated by reference.

FIELD OF THE INVENTION

The present invention is in the field of carbon-carbon composite materials. In particular, this invention contemplates carbon-carbon composite materials that are useful as friction components, for instance in aircraft landing system brake assemblies.

BACKGROUND OF THE INVENTION

Many aircraft brakes are made of carbon-carbon composite materials. Aircraft brakes are subjected to high temperatures, which may change the properties of the carbon and the friction surface and lead to variation in the friction performance of the brake. Other factors that may increase variation in friction performance of carbon-carbon composite materials are variation in the carbon microstructure, variation in the fiber/matrix ratio, and differences in the energy levels of the previous stop or stops performed by the brake. Also, a desirable property of a carbon-carbon friction material is a low wear rate. The present invention provides a method of improving the wear rate of a carbon-carbon composite friction material. The present invention at the same time provides a carbon-carbon composite friction material which has a very stable friction performance.

SUMMARY OF THE INVENTION

It has been discovered that titanium carbide, when uniformly distributed into carbon-carbon composite preforms in the form of particles of particular particle size, provides the preforms with beneficially modified friction and wear properties. Carbon-carbon composite brakes made in accordance with the present invention have improved wear rates and stable, consistent friction performance.

Accordingly, this invention provides a method of improving wear and dynamic stability in a carbon-carbon composite brake disc. This method embodiment of the present invention involves manufacturing the carbon-carbon composite brake discs from preforms comprising carbon-containing fibers, resin binder, and titanium carbide particles having a particle diameter in the range of from 0.01 to 10 microns. In accordance with the present invention, the dynamic stability of the brakes manufactured is characterized by a brake effectiveness $\mu$ of less than 0.200, preferably less than 0.100, wherein $\mu$ is defined by the formula $$\mu = \frac{T_{Average}}{(p_{Average} - bprt)(2N_R)A_p R_m}$$

in which $T_{Average}$, $p_{Average}$, bprt, $2N_R$, $A_p$, and $R_m$ are as defined hereinbelow.

Another embodiment of the present invention is a carbon-carbon composite brake disc preform comprising carbon fibers and resin binder, wherein the preform has particulate titanium carbide uniformly distributed throughout its mass. The particles of titanium carbide in this embodiment generally range in size from 0.01 to 10 microns in diameter. Preferably the particles have an average particle size of 1-2 microns and an apparent porosity in the range 0.5-0.6. A particularly preferred particulate titanium carbide has an average particle size of 1.4 microns and an apparent porosity of 0.545.

Still another embodiment of this invention is a method of making a carbon-carbon composite preform. In this method, one combines, e.g. 0.1 to 15 parts by weight titanium carbide particles ranging in size from 0.01 to 10 microns in diameter, 20 to 85 parts by weight resinous binder, and 20 to 80 parts by weight carbon fibers or carbon fiber precursors in a mold. The titanium carbide particles used in this process preferably have an average particle size of 1-2 microns and an apparent porosity in the range 0.5-0.6. Subsequently, one subjects the combined components to pressure and heat to carbonize the resinous binder by methods that are in general familiar to those skilled in the art, thereby providing a carbon-carbon composite preform having particulate titanium carbide uniformly distributed throughout its mass. In this method, the mold is most preferably one that is configured to provide a preform in the shape of an aircraft landing system brake disc. Prior to combining the titanium carbide and the binder with the fibers in this process, the particulate titanium carbide may be mixed with liquid binder, the resulting TiC/binder mixture may then solidified, and the resulting solid TiC/binder mixture may be ground into a fine powder for use in the process.

Yet another embodiment of the present invention is a composition for preparing a carbon-carbon composite friction material. This compositional embodiment is made up of carbon fibers or carbon fiber precursors, powdered or liquid resin binder, and titanium carbide particles ranging in size from 0.01 to 10 microns in diameter. In this composition, the carbon fiber or carbon fiber precursors may constitute 15-80 weight-% of the composition, the powdered or liquid resin binder may constitute 20-85 weight-% of the composition, and the titanium carbide particles may constitute 0.1-15 weight-% of the composition.

DETAILED DESCRIPTION OF THE INVENTION

Titanium carbide powder may be included in a composite material during the manufacturing stage, along with the carbon fibers and matrix material. In accordance with this invention, the titanium carbide particles have diameters in the range 0.01 to 10 microns. Particle size of titanium carbide powders may be determined in accordance with the procedures described in ASTM B-330-02. It has been found that, although excellent friction performance can be achieved with titanium carbide particles larger than 10 microns in diameter, the wear rate of carbon-carbon composites made with such particles increases to levels that are generally unacceptable. More preferably, the particles are in the range 0.5 to 5 microns in diameter. A specific example of a particulate titanium carbide that may be used in this invention is Grade 2049 TiC from Pacific Particulate Materials Ltd. of Port Coquitlam, B.C., Canada.

The carbon-carbon composite preforms of this invention include from 15 to 80 weight-%, preferably from 40 to 80 weight-%, more preferably from 50 to 65 weight-%, carbon fiber, from 20 to 85 weight-%, preferably from 20 to 65 weight-%, more preferably from 30 to 45 weight-%, binder, and from 0.1 to 15 weight-%, preferably from 1 to 15 weight-%, more preferably from 2 to 8 weight-%, of the titanium carbide particles. It is important that the titanium carbide (or titanium component) be dispersed or uniformly distributed throughout the entire carbon-carbon composite that will be used as friction material. This will ensure consistent friction performance throughout the life of the brake.

Those skilled in the art are familiar with many methods of making carbon-carbon friction materials. In all cases, carbon fibers—or carbon fiber precursors, such as pitch fibers or polyacrylonitrile (PAN) fibers—are used to provide architecture and strength to the composite. The fibers may be of random orientation or the fibers may have a well-defined architecture, obtained e.g. by a controlled spraying of chopped fibers into a mold. Fibers ranging in length from 1 to 30 mm are normally employed in this invention. However, fibers of other lengths may be used. While it is often convenient to make use of "chopped" fibers, the only requisite of the form of the fibers is that they permit the titanium carbide particles to be uniformly distributed in the regions of the preform that will function as friction material. Accordingly, other sorts of fibers, including "continuous" fibers, may be employed in this invention. One specific example of a carbon fiber that can be used in the present invention is Zoltek 48 K carbon fiber, available from Zoltek Corporation of St. Louis, Mo.

A carbon-bearing resinous binder, such as a pitch-based binder or a phenolic resin binder, is also a significant part of the present carbon-carbon composite friction materials. Those skilled in the art of making carbon-carbon composite friction materials are familiar with a wide variety of suitable pitch-based, phenolic, and similar resin binders. The resin binder is carbonized during processing of the precursor mixture to prepare a preform which has a carbon matrix bonded to the reinforcement fibers.

In accordance with the present invention, titanium carbide particles are dispersed or uniformly distributed throughout the entire carbon-carbon composite, e.g., by subjecting a precursor mixture composition to mixing in a Hobart blender. One approach for ensuring good distribution is to mix the TiC powder with hot liquid binder, solidify the mixture by cooling, and then grinding the solid TiC/binder mixture into a fine powder. This coats the titanium carbide particles with binder and ensures that distribution of the titanium carbide in the preform is quite uniform, because when the preform is heated and pressed, the liquid flows and fills voids in the fibrous matrix of the preform. Uniform distribution of titanium carbide throughout the carbon-carbon composite friction preform ensures that the friction film generated by wear is constant through the life of a brake made from the carbon-carbon composite preform of this invention.

EXAMPLES

Example 1

Five parts by weight of particulate titanium carbide, having an average particle size of 1.38 microns, an apparent porosity of 0.545, and a density of 4.93 g/cc, is added to 35 parts by weight liquid thermoplastic phenolic resin binder. To ensure adequate mixing, the titanium carbide powder and the phenolic resin powder are passed through an extruder and then re-ground into a powder. Subsequently, 60 parts by weight chopped carbon fibers are added to the powder. The mixture is thoroughly blended and then decanted into an annular mold, where it is pressed and heated to set the binder. Then the molded composition is charred to produce a carbon-carbon composite brake disc preform. The preform is densified by conventional CVI/CVD processing and machined to prepare a brake disc.

Example 2

Two hundred grams of particulate titanium carbide (nominal particle size 1.4 microns) is added to 1400 grams of liquid thermoplastic phenolic resin binder to provide 1600 grams of binder. To ensure adequate mixing, the titanium carbide powder and the phenolic resin powder are passed through an extruder and then re-ground into a powder. Separately, 2060 grams of carbon fibers (Zoltec 48 K, having a density of 1.78 g/cc) are provided. The fibers and the powder mixture are decanted into an annular mold, having the form of an aircraft landing system brake disc (stator), as follows. The binder powder is divided into 39 approximately equal lots and the fibers are divided into 38 approximately equal lots. The binder powder lots (containing TiC) and the fiber lots are deposited alternatively into the mold. Once all 3660 grams of material have been deposited into the mold in this way, the combined materials are pressed and heated to set the binder and consolidate the preform. The consolidation step includes pressurization to 200 psi for 50 minutes. The temperature is maintained at a level of 215° F. for 45 minutes during the consolidation step. The molded composition is then charred to produce a carbon-carbon composite brake disc preform. The preform is densified by conventional CVD processing and machined to prepare a brake disc having a thickness of 2.86 cm.

Example 3

Brake discs manufactured by conventional procedures (runs A-D) and brake discs made in accordance with the present invention (run E) were tested on a subscale dynamometer, with the following results:

| Run | | Wear per Surface per Stop ($10^{-4}$ inches) | Effectiveness |
|---|---|---|---|
| A | Production Baseline Material | 0.1183 | 0.291 |
| B | Production Baseline Material | 0.1333 | 0.351 |
| C | 70% Fiber/30% Phenolic | 0.1833 | 0.250 |
| D | Pitch Binder | 0.1033 | 0.321 |
| E | 60% Fiber/40% Phenolic/TiC | 0.0933 | 0.056 |

It can be seen that Run E, an embodiment of the present invention, demonstrated less wear. It also significantly lowered "effectiveness" as compared to Comparative Runs A-D. Reduced wear rates provide an clear economic advantage. Lower "effectiveness" increases the dynamic stability of aircraft braking systems.

Brake effectiveness is defined as a non-dimensional quantity relating the compressive (normal) force to the braking torque. In other words, it is a rotating machinery equivalent to the coefficient of friction. In the aircraft brake industry, the brake effectiveness is expressed as:

$$\mu = \frac{T_{Average}}{(p_{Average} - bprt)(2N_R)A_p R_m}$$

where:
a. $T_{Average}$—Average torque generated by the brake
b. $P_{Average}$—Average brake hydraulic fluid pressure
c. bprt—Brake pressure rotors tight, lowest pressure at which brake generates torque d. $2N_R$—Number of friction surfaces (twice the number of rotors $N_R$)

e. $A_p$—Total hydraulic fluid piston surface area f. $R_m$—Mean brake radius.

With respect to the effectiveness, aircraft brake friction materials are designed to satisfy four main functional goals: a) low effectiveness during most landing and taxi conditions; b) high effectiveness during a Rejected Take-Off (RTO) stop; c) low within stop variability (constant effectiveness values during the stop); and d) low average effectiveness variability between stops at different operating conditions. Low effectiveness during landing and taxi conditions is important for maintaining vibration free brake operation, which helps to reduce unscheduled brake removals and leads to increased profitability for the brake operator. An additional financial benefit usually associated with low effectiveness rates during landing and taxi is low wear rate (long brake life)

High effectiveness during RTO is a necessary condition for the safe operation of the aircraft during emergency braking conditions. Meeting the minimum RTO stopping distance specification is a mandatory requirement for brake qualification on the airplane.

Low within stop variability requirement is necessary for smooth braking operation preferred by airplane crew and passengers and also to ensure that the peak torque generated by the brake does not exceed the structural limits of the landing gear.

Low effectiveness variability under varying operating conditions is necessary to ensure good compatibility of the brake performance with the Brake Control System. Brake Control Systems can be tuned much easier to brakes that are predictable under various temperature, velocity, and pressure conditions.

What is claimed is:

1. A method for manufacturing a carbon-carbon composite brake disc from a preform, the method comprising densifying the preform to form the carbon-carbon composite brake disc, wherein the preform comprises carbon-containing fibers ranging in length from 1 to 30 mm, a carbon matrix bonding the carbon-containing fibers, wherein the carbon matrix is formed via carbonization of a resin binder, and titanium carbide particles having a particle diameter in the range of from 0.01 to 10 microns, and wherein the densified carbon-carbon composite brake disc exhibits a brake effectiveness μ of less than 0.200, wherein $$\mu = \frac{T_{Average}}{(p_{Average} - bprt)(2N_R)A_p R_m}$$

where:

$T_{Average}$—Average torque generated by the brake;

$P_{Average}$—Average brake hydraulic fluid pressure;

bprt—Brake pressure rotors tight, lowest pressure at which the brake generates torque;

$2N_R$—Number of friction surfaces (twice the number of rotors $N_R$);

$A_p$—Total hydraulic fluid piston surface area; and $R_m$—Mean brake radius.

2. The method of claim 1, wherein the brake effectiveness μ is less than 0.100.

3. The method of claim 1, wherein the preform comprises from 15 to 80 weight-% carbon fiber and from 0.1 to 15 weight-% titanium carbide particles.

4. The method of claim 3, wherein the preform comprises from 50 to 65 weight-% carbon fiber and from 2 to 8 weight-% titanium carbide particles, the titanium carbide particles ranging in size from 0.5 to 5 microns in diameter.

5. The method of claim 1, wherein the carbon-containing fibers comprise chopped carbon-containing fibers.

6. The method of claim 1, wherein the titanium carbide is uniformly distributed throughout the carbon-carbon composite brake disc.

7. The method of claim 1, wherein the titanium carbide particles comprises titanium carbide particles coated with the resin binder.

8. The method of claim 7, further comprising:

mixing the titanium carbide particles with the resin binder to form a mixture;

solidifying the mixture; and grinding the solidified mixture to form the titanium carbide particles.

9. The method of claim 1, wherein the resin binder comprises a pitch-based binder or a phenolic resin binder.

10. The method of claim 1, further comprising combining the titanium carbide particles, the resin binder, and the carbon-containing fibers in a mold; and subjecting the combined titanium carbide particles, resin binder, and carbon-containing fibers to pressure and heat to carbonize the resin binder, thereby forming the carbon-carbon composite preform.

11. The method of claim 1, wherein densifying the preform comprises densifying the preform via at least one of chemical vapor deposition (CVD) and chemical vapor infiltration (CVI).

12. The method of claim 1, further comprising machining the densified preform to form the carbon-carbon composite brake disc.

13. The method of claim 1, further comprising:

mixing titanium carbide particles ranging in size from 0.01 to 10 microns in diameter with liquid binder to form a mixture;

solidifying the resulting mixture;

grinding the resulting solid mixture into a fine powder comprising titanium carbide particles;

combining the fine powder, resin binder, and carbon fibers or carbon fiber precursors in a mold, wherein the carbon fibers or carbon fiber precursors range in length from 1 to 30 mm; and subjecting the combined components to pressure and heat to carbonize the resin binder, thereby providing the carbon-carbon composite preform, wherein the titanium carbide is uniformly distributed throughout the carbon-carbon composite preform.

14. The method of claim 13, wherein the mold is selected to provide a preform configured as an aircraft landing system brake disc.

15. The method of claim 13, wherein the titanium carbide particles of the fine powder exhibit an average particle size of 1-2 microns and an apparent porosity in the range 0.5-0.6.

16. A method of manufacturing a carbon-carbon composite brake disc, the method comprising:

combining carbon-containing fibers ranging in length from 1 to 30 mm, a resin binder, and titanium carbide particles having a particle diameter in the range of from 0.01 to 10 microns to form a mixture, wherein the titanium carbide particles comprise titanium carbide particles coated with the resin binder; and carbonizing the resin binder to form a preform, the preform comprising a carbon matrix formed via carbonization of the resin binder, carbon-containing fibers, and titanium carbide particles, wherein the carbon matrix bonds the carbon-containing fibers and titanium carbide particles; and densifying the preform to form the carbon-carbon composite brake disc, wherein the carbon-carbon composite brake disc exhibits a brake effectiveness µ of less than 0.200, wherein $$\mu = \frac{T_{Average}}{(p_{Average} - bprt)(2N_R)A_p R_m}$$

where:
$T_{Average}$—Average torque generated by the brake;
$P_{Average}$—Average brake hydraulic fluid pressure;
bprt—Brake pressure rotors tight, lowest pressure at which the brake generates torque;
$2N_R$—Number of friction surfaces (twice the number of rotors $N_R$);
$A_p$—Total hydraulic fluid piston surface area; and
$R_m$—Mean brake radius.

17. The method of claim 16, wherein the mixture comprises from 15 to 80 weight-% carbon fiber, from 20 to 85 weight-% binder, and from 0.1 to 15 weight-% titanium carbide particles.

18. The method of claim 16, wherein the titanium carbide is uniformly distributed throughout the carbon-carbon composite brake disc.

19. The method of claim 16, wherein the carbon-carbon composite brake disc exhibits a brake effectiveness µ of less than 0.100.

20. The method of claim 16, wherein the mixture comprises a first mixture, the method further comprising:
mixing titanium carbide particles with the resin binder to form a second mixture;
solidifying the second mixture; and
grinding the solidified mixture to form the titanium carbide particles coated with the resin binder.

* * * * *